(12) United States Patent
Botti et al.

(10) Patent No.: US 9,645,806 B2
(45) Date of Patent: May 9, 2017

(54) METHOD TO CONVEY AN APPLICATION'S DEVELOPMENT ENVIRONMENT CHARACTERISTICS TO THE HOSTING PROVIDER TO FACILITATE SELECTION OF HOSTING ENVIRONMENT OR THE SELECTION OF AN OPTIMIZED PRODUCTION OPERATION OF THE APPLICATION

(71) Applicant: International Business Machines Corporation, Armonk, NY (US)

(72) Inventors: Derek W. Botti, Holly Springs, NC (US); Ramamohan Chennamsetty, Highland, NY (US); Anji D. Greene, Austin, TX (US); Charles S. Lingafelt, Durham, NC (US); William H. Tworek, Hopkinton, NH (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 14/502,293

(22) Filed: Sep. 30, 2014

(65) Prior Publication Data
US 2016/0092185 A1 Mar. 31, 2016

(51) Int. Cl.
*G06F 9/445* (2006.01)
*H04L 29/06* (2006.01)
(Continued)

(52) U.S. Cl.
CPC .......... *G06F 8/60* (2013.01); *G06Q 10/0635* (2013.01); *H04L 63/1433* (2013.01); *G06F 8/71* (2013.01); *G06F 11/3668* (2013.01)

(58) Field of Classification Search
CPC ..... G06F 8/60; G06F 8/70; G06F 8/71; G06F 11/3668; G06Q 10/0635; H04L 63/1433
(Continued)

(56) References Cited

U.S. PATENT DOCUMENTS 7,747,987 B1 * 6/2010 Akarte ................ G06F 11/3688
702/179
8,046,755 B2 10/2011 Gaa-Frost et al.
(Continued)

FOREIGN PATENT DOCUMENTS

CA 2 681 013 A1 9/2008

*Primary Examiner* — Qing Chen
(74) *Attorney, Agent, or Firm* — Scully, Scott, Murphy & Presser, P.C.; Kurt P. Goudy, Esq.

(57) ABSTRACT

A system and method for deploying a software application to a hosting environment that considers the development environment, and bases any decision on data about the development environment to make a selection of hosting environment and/or operational attributes. The system and methods determines and attaches metadata describing the development environment to an application, then uses that metadata to select a deployment model, and to select an operational model. The method assigns a security risk score to a developed application which may be hosted in a virtual hosting environment or a physical hosting environment. The system and method considers security issues in its scoring and focuses on the security risk associated with an application that would be deployed. The method steps convey the application attributes, such as complexity, robustness, likelihood of operational issued, likelihood of compromise, etc. to the deployment and operating entities.

20 Claims, 10 Drawing Sheets

(51) Int. Cl.
*G06Q 10/06* (2012.01)
*G06F 9/44* (2006.01)
*G06F 11/36* (2006.01)

(58) Field of Classification Search
USPC .................................................. 717/168–178
See application file for complete search history.

(56) References Cited

U.S. PATENT DOCUMENTS

| | | | |
|---|---|---|---|
| 8,255,881 | B2 | 8/2012 | Wilson et al. |
| 8,291,378 | B2 | 10/2012 | Arnold et al. |
| 8,353,021 | B1 | 1/2013 | Satish et al. |
| 8,572,679 | B1 * | 10/2013 | Wang ........................ G06F 8/65 370/328 |
| 8,694,964 | B1 * | 4/2014 | Picard ....................... G06F 8/73 715/200 |
| 2002/0103885 | A1 * | 8/2002 | Hamada ............... G06Q 20/382 709/219 |
| 2005/0223354 | A1 * | 10/2005 | Drissi ....................... G06F 8/36 717/114 |
| 2007/0157195 | A1 * | 7/2007 | Gaa-Frost ................. G06F 8/60 717/174 |
| 2008/0222626 | A1 * | 9/2008 | Kumar Hirsave .. G06F 11/3466 717/168 |
| 2008/0229420 | A1 | 9/2008 | Jeschke et al. |
| 2008/0263534 | A1 * | 10/2008 | Hirsave ................. G06F 21/577 717/168 |
| 2009/0138843 | A1 * | 5/2009 | Hinton ....................... G06F 8/74 717/101 |
| 2009/0183137 | A1 * | 7/2009 | Ponnath .................... G06F 8/20 717/101 |
| 2010/0191952 | A1 * | 7/2010 | Keinan .................. G06Q 10/06 713/100 |
| 2011/0296372 | A1 | 12/2011 | Bird et al. |
| 2013/0173768 | A1 | 7/2013 | Kundu et al. |
| 2013/0226652 | A1 * | 8/2013 | Bilello ............... G06Q 10/0635 705/7.28 |
| 2015/0365437 | A1 * | 12/2015 | Bell, Jr. ................. H04L 63/20 726/1 |
| 2016/0239402 | A1 * | 8/2016 | Zieder ..................... G06F 11/36 |

* cited by examiner

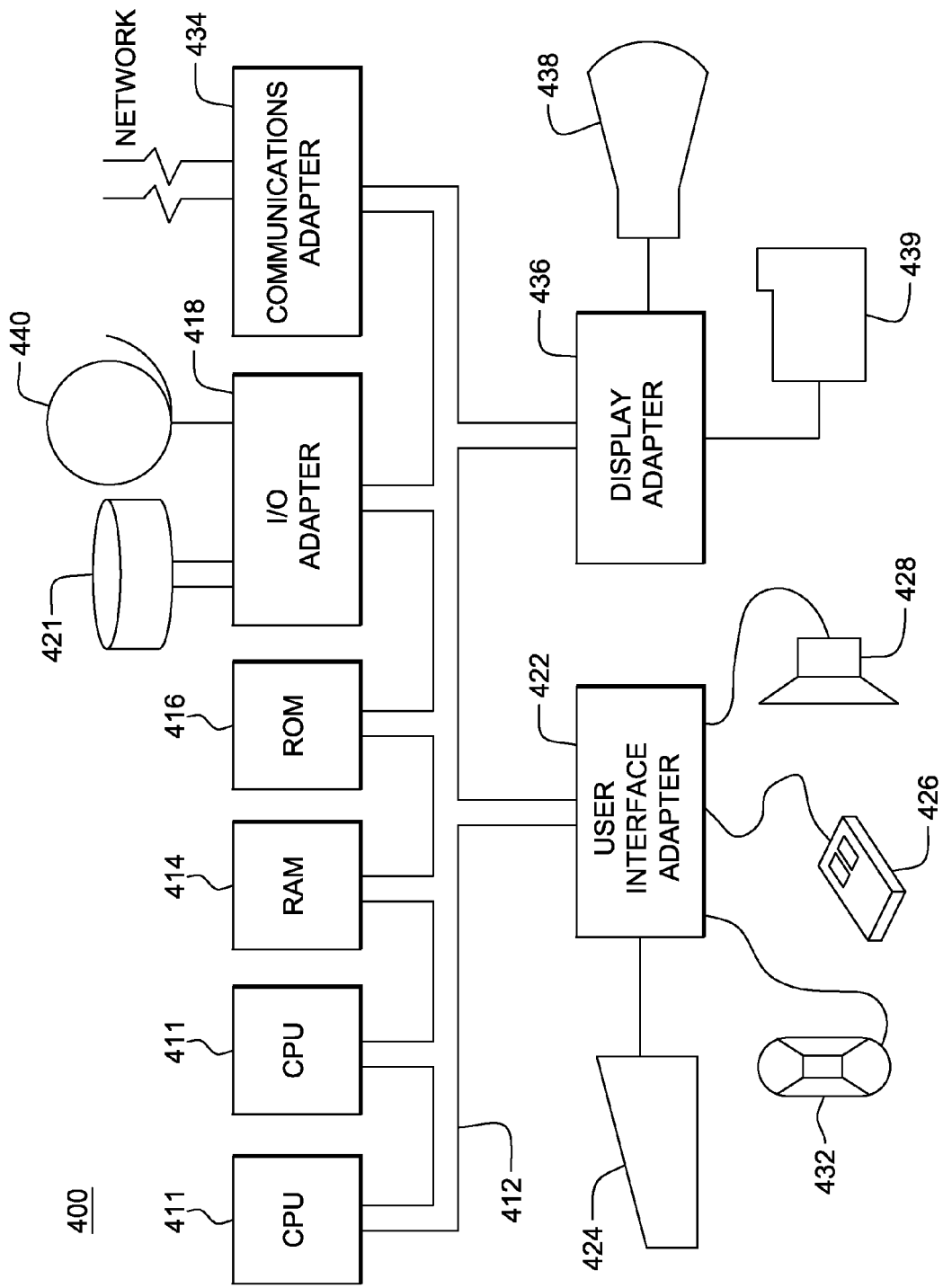

METHOD TO CONVEY AN APPLICATION'S DEVELOPMENT ENVIRONMENT CHARACTERISTICS TO THE HOSTING PROVIDER TO FACILITATE SELECTION OF HOSTING ENVIRONMENT OR THE SELECTION OF AN OPTIMIZED PRODUCTION OPERATION OF THE APPLICATION

BACKGROUND

Technical Field

The present invention relates to software/program application development and application deployment by quantifying a software application's development environment, then conveying an application's attributes to the deployment and operations entities, which use this information to optimize the selection of deployment and operation actions.

Description of the Related Art

Today, applications are typically created by a single entity, then procured, deployed and operated by other entities, with the deployment and operational entities having no information about the implied quality of the application, the degree of complexity of the application, the degree of robustness of the application, the likelihood that the application will experience operational problems (sometimes known as "bugs"), the likelihood that the application can be compromised by hackers.

Today, no method is known to convey application attributes, such as complexity, robustness, likelihood of operational issues, likelihood of compromise, to the deployment and operating entities.

Within knowledge of these application attributes, non-optimized or incorrect decision for deployment and operations may be made as typically, ad hoc views of the application's attributes drive the selection of deployment and operational models.

SUMMARY

A system and method solves these problems by quantifying an applications development environment, then conveying the application's attributes to the deployment and operations entities, which use this information to optimize the selection of deployment and operation actions.

This results in substantial operational cost savings, as the most highly cost optimized operational environment is selected as well as substantial improvement in an applications operational characteristics, such as security of application and its data, down-time of the application, etc.

According to one aspect, there is provided a system and method of deploying a software application to a hosting environment. The method comprises: receiving, at a hosting provider, metadata attributes characterizing a development process of the software application; assessing a risk of deploying the application based on the received metadata attributes; selecting a deployment environment for the software application from among one or more deployment environments based on the assessed risk, and deploying the software application at selected deployment environment, wherein a processing device performs one or more the receiving, assessing, and selecting.

According to yet another aspect of the present invention, the present invention provides a system of deploying a software application to a hosting environment. The system comprises: a memory storage device; a processor device associated with the memory storage device, the processor device configured to: receive metadata attributes characterizing a development process of the software application; assess a risk of deploying the application based on the received metadata attributes; and select a deployment environment for the software application from among one or more deployment environments based on the assessed risk, wherein the software application is deployed at the selected deployment environment.

A computer program product is provided for performing operations. The computer program product includes a storage medium readable by a processing circuit and storing instructions run by the processing circuit for running a method. The storage medium readable by a processing circuit is not a propagating signal. The method is the same as listed above.

BRIEF DESCRIPTION OF THE SEVERAL VIEWS OF THE DRAWINGS

FIG. 4 illustrates one embodiment of an exemplary hardware configuration of a computing system programmed to perform the method steps described herein.

DETAILED DESCRIPTION

Detailed embodiments of the invention will be described in conjunction with the accompanying drawings. It should be appreciated that the following description of the detailed embodiments are to explain the execution of an example of the invention, rather to impose any limitation on the scope.

Figure 1A:
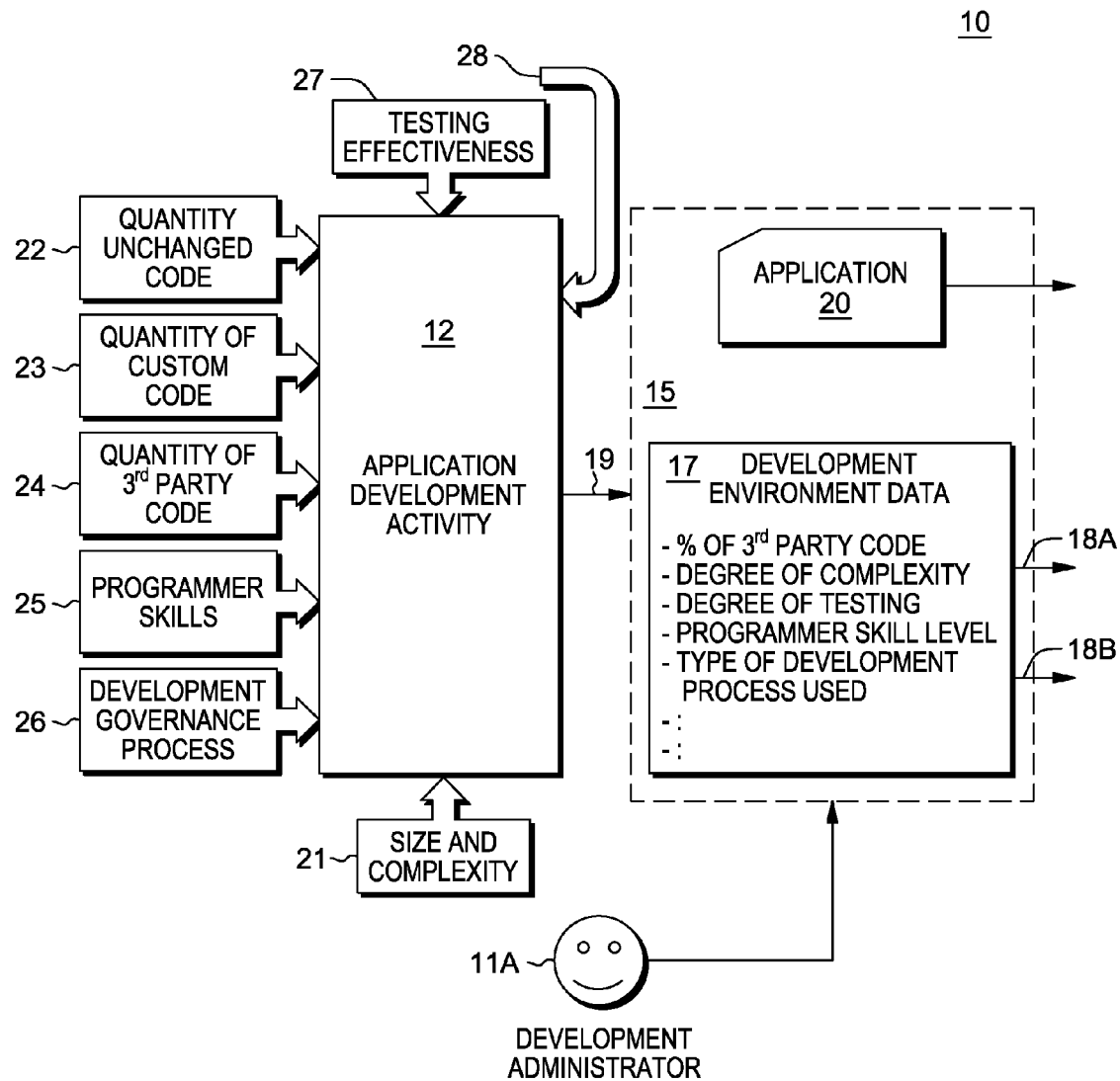
FIGS. 1A-1B show an embodiment of a system 10 implementing methods for facilitating selection of hosting environment or an optimized production operation for the application in one embodiment.

FIG. 1A shows a system diagram comprising programmed computing system 10 implementing methods described herein. In FIG. 1A, there is shown that activity relating to application development in an application development's environment 12 that may include a development tool to document the activity meta-data. The application development activity includes, but is not limited to: a degree of size and complexity 21 of the software application code; a quantity of unchanged code 22, a quantity of customized code 23, a quantity of code obtain/incorporated from 3rd parties 24; a skill level of the programmer(s) 25; a development governance process employed 26; and a code testing effectiveness level 27. Other software application's development environment attributes 28 related to software application development environment 12 include, but are not limited to: a proportion of mature, vetted open source code verses proprietary code; a proportion of the application written by "certified programmers"; a proportion of the code auto-generated by tools within the development environment; a historical bug rates for the development team; a proportion of the application which is new/modified code' a degree of maturity of the code; a proportion of the code that was tested; a proportion of the code that was stress tested; a percentage of projected bugs found and fixed; a coding environment used; a coding language used; a size of application; a number of external interfaces; a complexity of external interfaces; a quality of code obtain/incorporated from 3rd parties; a productivity of coders; a results of security vulnerability assessments of application; a results of security vulnerability testing of application; a results of 3rd party testing and certifications; a physical location of where components were created; a type of development process(es) followed.

In one embodiment, the Application Development component is implemented with software development tools, such as International Business Machines Corp.'s Rational Software Development tools.

It is understood that not all of the listed illustrated attributes would apply to every application, and that this list is non-limiting and provided for illustrative purposes only.

In FIG. 1A, system 10 generates a package 15 including the application 20 and the attached associated metadata (application development attributes) 17 provided by and received from the code supplier via an input 19. An observer such as a development administrator 11A (e.g., human user or intelligent non-human entity), characterizes and/or quantifies one or more of the received/observed application's development environment (metadata attributes) pertaining to the qualities of the software application development 20. These characterizations or a subset thereof may be normalized, i.e., quantified with a weight, to form a set of application's development environment data attributes. The observer (e.g., a development administrator) 11A may optionally aggregate the normalized data attributes into a single score or value (index). That is, the individual quantified attributes 17 may be conveyed or a subset of these attributes may be conveyed as a single value.

Figure 1B:
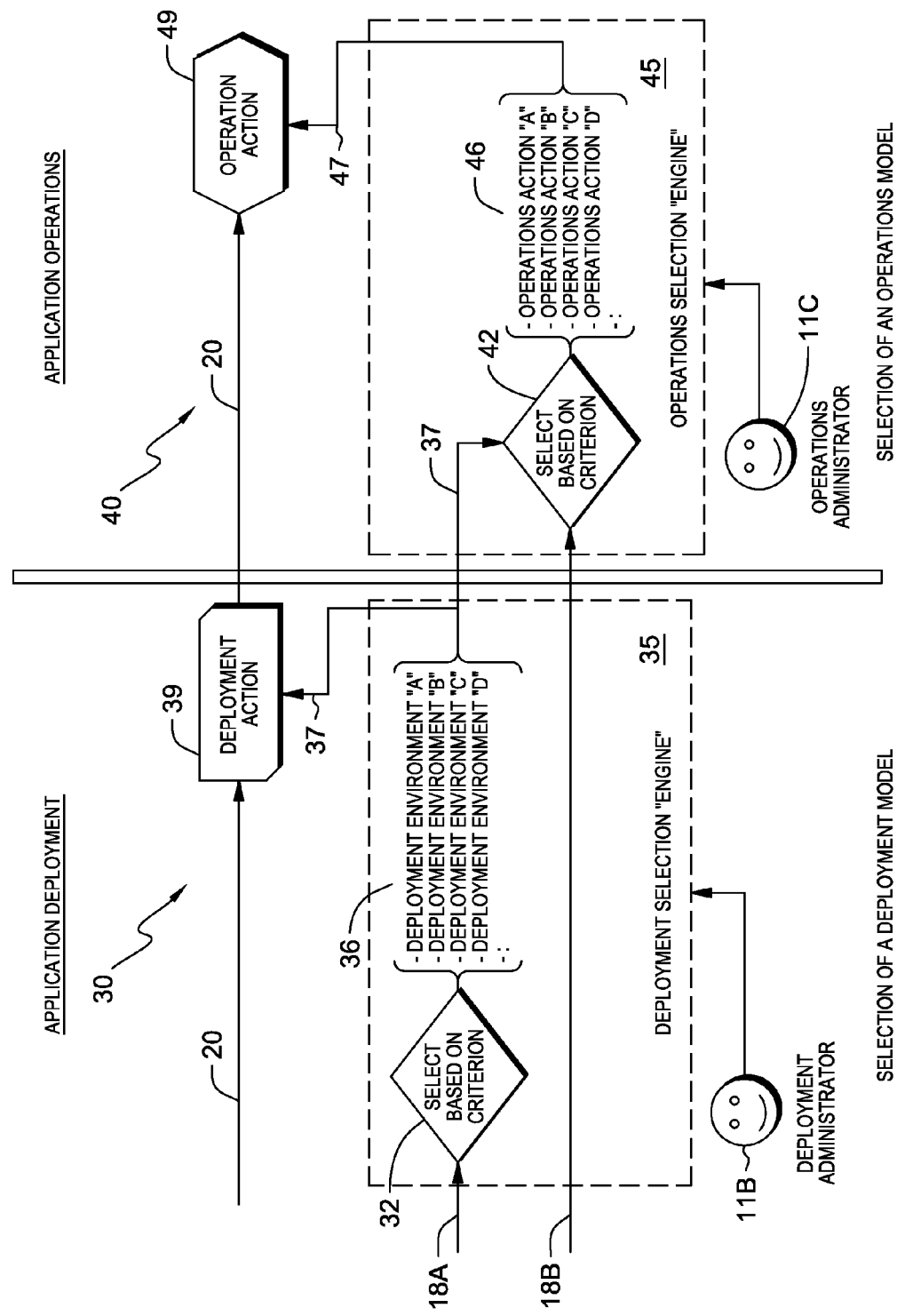

As shown in FIG. 1B, a first set (or sub-set) 18a of these application development environment attributes are conveyed as input to a host application deployment environment 30, and a second set (or sub-set) of the application's development environment attributes are conveyed as input to an application operational environment 40. These sets (or sub-sets) of attributes 18a and 18b may be the same or can be tuned differently based on the receiving environment. For example, metadata attributes set 18a may be more appurtenant to application deployment issues while metadata attributes set 18b may be more appurtenant to operational support issues for the software. A processing component 35, having processing components to function as a development selection engine, receives the set 18a of the normalized data attributes and/or the single score values. Development selection processing engine 35 implements and applies one or more criterion 32 against the normalized data attributes 18a, to select one deployment environment 37 from among a plurality of deployment environments 36 for a deployment action 39 to deploy the application 20. That is, a deployment environment is selected, based on the criteria applied to the application's development environment attributes. In is understood that a human user such as a deployment administrator 11B (or intelligent non-human entity such as a software system) may govern, direct or influence actions performed by the development selection processing engine 35.

As shown in FIG. 1B, the application's development environment attributes 18b are conveyed to the application operations environment 40. A processing component 45, having processing components to function as an operations selection engine, receives a set 18b of the normalized data attributes and/or the single score value. Development selection processing engine 45 implements and applies one or more criterion 42 against the normalized data attributes 18b, to select one operations environment 47 from among a plurality of operations environments 46 for an operations action 49 supporting the deployed application 20. That is, an operations environment is selected, based on criteria applied to the application's development environment attributes. In is understood that a human user such as an operations administrator 11C (or intelligent non-human entity such as a software system) may govern, direct or influence actions performed by the operations selection processing engine 45. Additionally, at processing component 45, an operation environment 47 is selected, based further on the selected deployment environment 37 at processing component 35 and the application's development environment attributes.

In one embodiment, the system and methods employed in FIGS. 1A and 1B, would be very valuable when related to an enterprise application set. By applying the methods described, a company could reduce the risk for creating and deploying new applications used to support the operations of its business, e.g., as it relates to cloud infrastructures and hosting offerings.

Moreover, the costs of an applications deployment and operation would be reduced by assuring that more robust applications are created and these applications are deployed into the proper hosting environments thus creating even more total stability. The assignment of risk to the known application attributes in the given method creates an easier path for problem determination and catches any potential issues earlier in the life cycle process when the costs to remediate are typically much less than once found in production.

This approach has potential to save substantial costs to a hosting entity and allow a host entity to sell additional hosting services.

Additionally, assignment of the values in this method can be used to further determine an appropriate SLA (service level agreement) or SLO (Service Level Objective) for the hosting infrastructure based on the acceptance of the known factors.

Figure 2A:
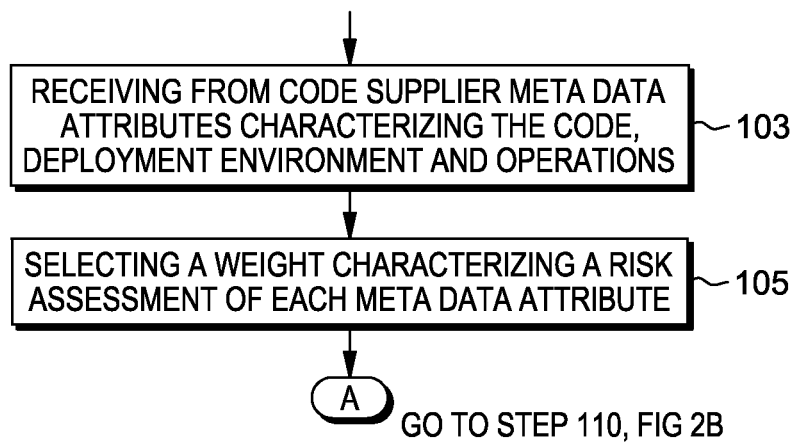
FIGS. 2A-2F show various embodiments of methods to identify application attributes and the associated development environment attributes used to select a hosting deployment environment.

FIG. 2A shows, in one embodiment, a method provided to identify application attributes and the associated development environment attributes that are to be used to select a hosting deployment environment and select an operational model.

As referred to herein, the methods and method steps may include use of "roles" such as an Administrator, a Supplier, etc. to explain the flows, but in actuality these roles can also be performed by "systems" or non-human entities, which enable flow automation.

With respect to system processing 10 of FIG. 1A, a method 100 (FIG. 2A) is employed, e.g., in a first Preparation Phase, to characterize a software application's development environment attributes. The method 100 includes, in an example embodiment, at 103, the receiving, by a processing device, of Meta data attributes characterizing the code, deployment environment and operations that have already been established by the Supplier of the code. These Meta data attributes may include those attributes or a sub-set thereof established by the supplier/developer of the code that characterizes the activity relating to application development in an application development's environment 12. As will be described, these collected metadata attributes are used for one or more of: selecting the environment, and in evaluating the risk of a given environment. The supplier or code developer attaches the Meta data attributes to the code, and assembles the meta data attributes.

Then, in an operation phase, the method performs by an administrator, or an automated or semi-automated system: the evaluating of the risk (of the code) when run in a given hosted environment or operational model. The administrator 11B (FIG. 1B) may decide what is important in running the code, and assign a weight to the attributes. For example, code coming from another country may be more risky, so the assessment of risk for each of the attributes (for that code) is provided by an administrator of the hosting environment, i.e., how the code is being deployed. For example, more risky code may be tolerable when deployed internal to a company environment, as opposed to a public deployment in which a high risk code is less tolerable. It is understood that assigned weight may be "1" but may be adjusted or set to any value by the administrator. In an example embodiment, this method includes, at 105, an administrator (or equivalent software system) selecting a weight value of a risk assessment for each meta data attribute.

Figure 2B:
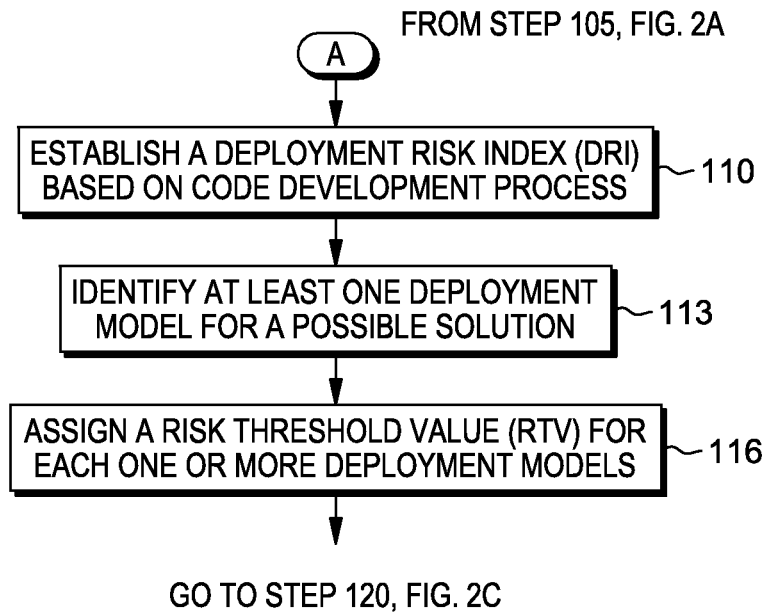

The process proceeds to methods depicted in FIG. 2B for selecting a deployment model from given set of deployment models based on a risk threshold. These method steps are performed by the development selection processing engine 35 (of FIG. 1B). At 110, there is first performed calculating a Deployment Risk Index (DRI) based on the code development process attributes that may be computed as a product according to:

DRI=sum over all elements' weight*value of risk assessment Meta data element.

In one embodiment, a Preparation Phase includes a development Administer (or equivalent software system): establishing the DRI at step 110, FIG. 2B; then, at 113, identifying one or more various deployment models for the possible solution; and at 116 characterizing each possible deployment model of a given set of deployment models 36, and assigning it a Risk Threshold Value (RTV). For example, a risk threshold will be assessed depending upon how the code is deployed, i.e., the code deployment environment. Deployment host environment in the assigning of the RTV may be dependent upon the type of controls employed at the host, e.g., security controls, robustness of the equipment, etc. The RTV assessments are encapsulated as criteria employed at 32 to select the Deployment Environment as shown in FIG. 1B.

Figure 2C:
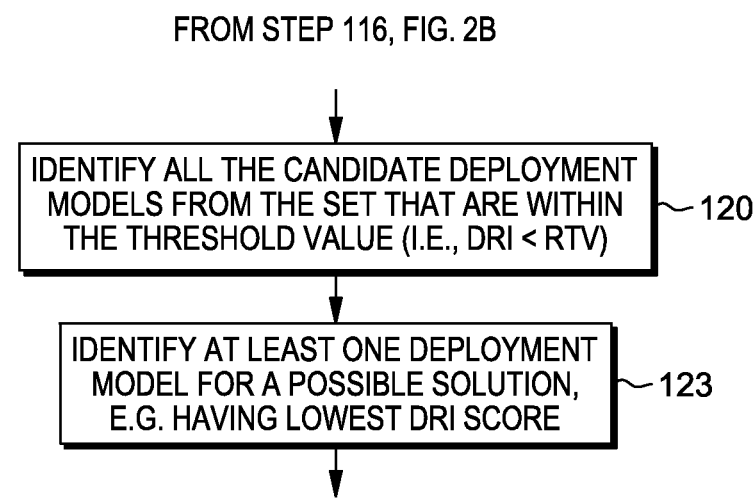

FIG. 2C depicts an Operation phase for selecting a Deployment Model from the given set of deployment models based on risk threshold. In this embodiment, given the Administrator (or equivalent software system) has identified various deployment models for the possible solution and identified a risk threshold value (RTV) for each deployment model, the Deployment Selection Engine 35 may first, at 120, identify all the candidate deployment models (each represented by a DRI) from the set that are within the threshold value (i.e., DRI<RTV) and the engine (or an administrator) may select one deployment model from that candidate set. Then, Deployment Selection Engine 35 deploys the workload onto a deployment model that reduces the overall risk by selecting at 123 the deployment model with the least DRI score.

Figure 2D:
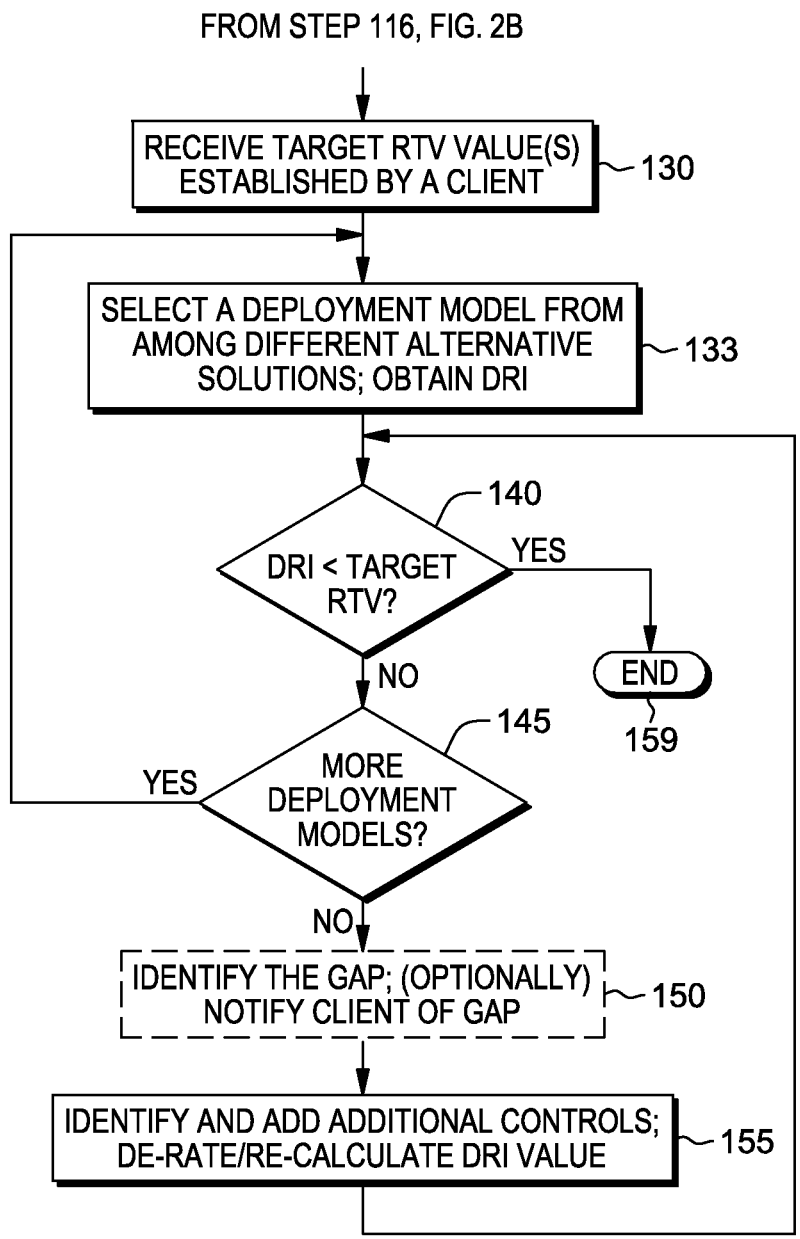

In an alternate embodiment to the method of FIG. 2C, the Deployment Selection Engine 35 performs method steps as depicted in FIG. 2D, where in a Preparation Phase depicted at 130, the engine 35 receives from a client (another entity, not an administrator) or equivalent software system the client's established RTV thresholds.

Then, to achieve the specific target RTV set by the client, at 133, the Deployment Selection Engine 35 selects components (a deployment model) from among different alternative solution components to achieve the specific threshold or target RTV. From the selected components of the deployment model, a DRI is calculated. Then, the processing engine 35 employs methods including: at 140, determining whether the DRI is less than the RTV, i.e., DRI<RTV. If it is determined that the DRI is less than the RTV for the selected candidate deployment model, then that deployment model is used for the application and the process ends at 159. Otherwise, returning to 140, FIG. 2D, if the DRI value is greater than the target RTV, a determination is first made at 145 as to whether there is any more deployment models (components) to be selected. If there is more deployment models to be selected, the process returns to step 133 so that a new deployment model is selected and new DRI obtained for those selected components and the step 140 through 145 are repeated. However, if at 145 there is no more deployment models left to select, then the process proceeds to step 150, where the Deployment Selection Engine identifies the gap between the DRI and RTV values, and optionally may notify the client about the presence of the gap. In a further embodiment, given the identified gap the Deployment Selection Engine at 150, may look for and add additional controls to de-rate/re-calculate DRI value as will be described herein below in connection with FIG. 2E. If additional controls are added, the method will return to step 140 with the re-calculated DRI value and repeat steps for comparing that DRI value to the RTV value for that model.

Figure 2E:
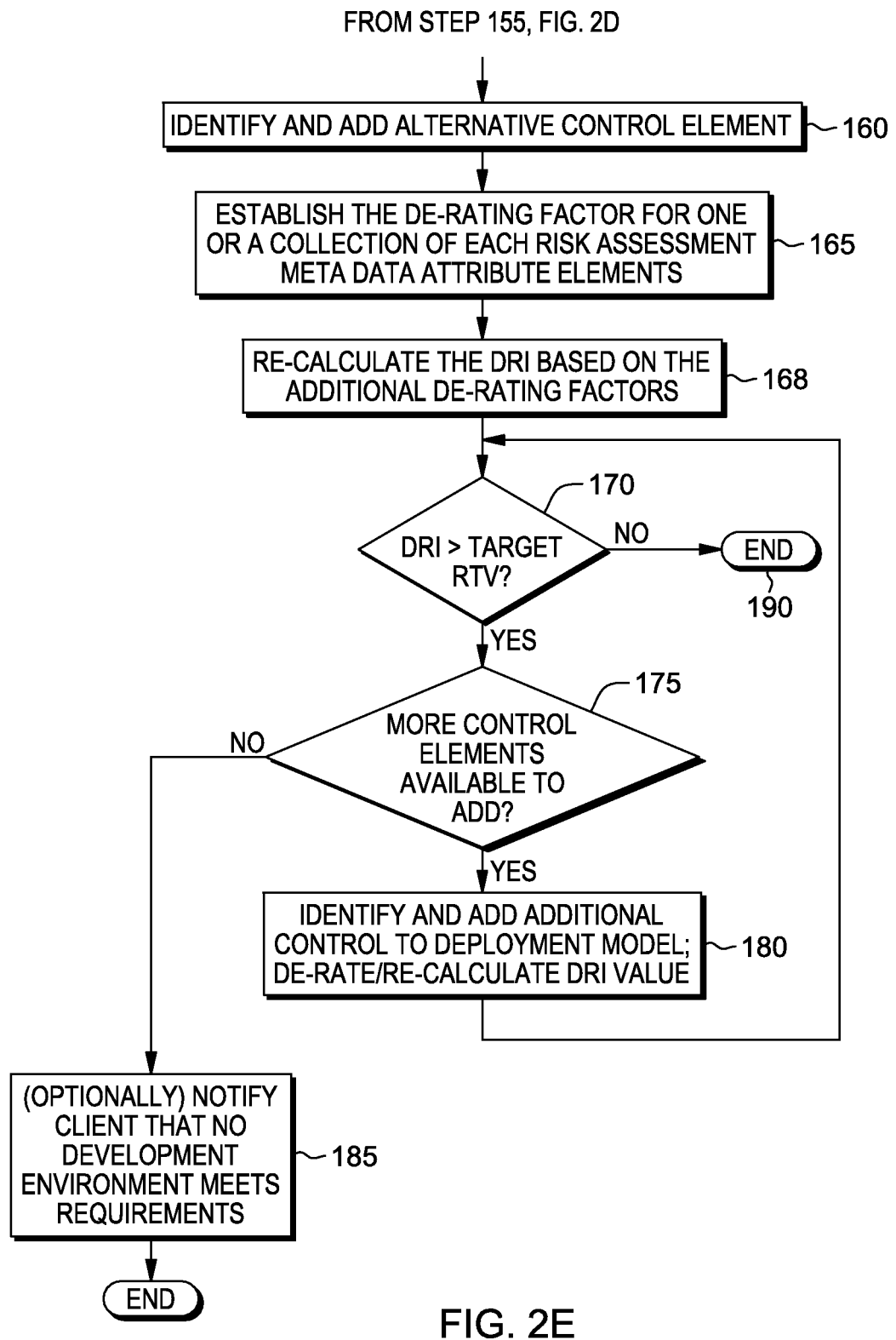

In a further alternate embodiment, in connection with FIG. 2E the Deployment Selection Engine 35 may employ methods to select a Deployment Model and select required augmentation (additional controls) to such a model given that there are additional alternative controls that can be provisioned within the deployment model. The method of FIG. 2E may be employed in the instance when there is a single deployment environment selected that cannot meet the needs of the client based on the criteria and the application's assessed DRI value. There may be a pre-defined set of additional actions to take within the deployment sphere, e.g., add a firewall, add more monitoring or analytics, increase CPU utilization, or increase memory to augment the deployment model. This establishes a de-rating factor for the DRI. That is, each of these additional actions or controls will include a de-rating value or weight, e.g., data monitoring subtracts 2 points, intrusion detection subtracts 3 points, which can be added (or subtracted from) the DRI value for that deployment model (i.e., the deployment environment Risk index rating changes, e.g., subtracting risk (a de-rating factor) by adding new controls or by combining new controls). In accordance with this embodiment, in a Preparation Phase processing at step 160, FIG. 2E, the method identifies an alternative control element to be added. For the alternative control element, the process at 165 establishes a de-rating factor for each one or a collection of each risk assessment meta data attribute elements for the alternative control. Then, in an Operation Phase depicted in FIG. 2E, at 168, for the alternative control element, there is computed a new risk index (DRI) based on the established de-rating factor(s). This may include steps taken by the administrator (or equivalent software system) to select a weight of each risk assessment meta data attribute element; and re-compute the DRI according to:

Deployment Risk Index=sum over all elements' weight*value of risk assessment meta data attribute element Then, at 170, the processes include: determining whether the DRI is greater than the RTV, i.e., DRI>target RTV value. If it is determined that the DRI is less than the desired RTV value, then the process selects the deployment model with the added control elements based on thresholds with respect to the calculated deployment risk index and deploys the application to the selected deployment model with the added control elements and the process ends at 190. Otherwise, if it is determined that the DRI is greater than the desired RTV value, then the process proceeds to 175 to determine whether there is any more control elements available to be added. Additional control elements may include, but are not limited to: Installing an application firewall; installing vulnerability detection tools; employing data monitoring tools; employing Intrusion prevention/detection tools, etc. If there are control elements available, then the process proceeds to step 180 to select the additional control element, establish the de-rating factor and re-calculate the Deployment Risk Index (given the additional control element) and the process steps 170-175 are repeated. If at 175 it is determined that there are no more control elements available to be added, the process proceeds to 185, FIG. 2E where optionally, the client may be notified that "no deployment environment meets requirements".

Figure 2F:
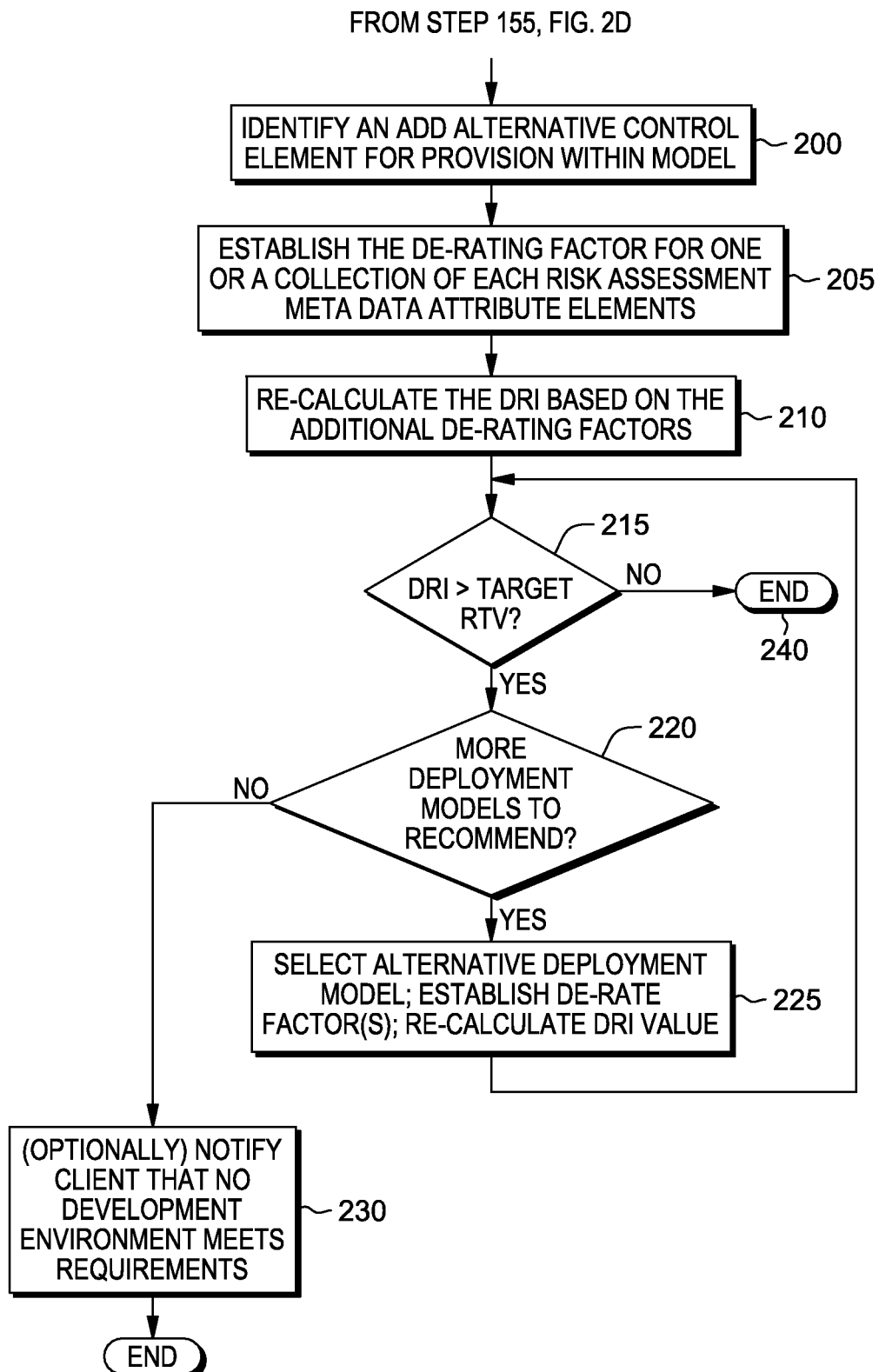

In a further alternate embodiment, in connection with FIG. 2F, the Deployment Selection Engine 35 may employ methods to recommend an alternative deployment model based on the risk evaluation given that there are additional alternative controls that can be provisioned within the deployment model. For example, if the deployment model does not meet risk threshold criteria, then the deployment environment may be changed, e.g., instead of a public deployment, making the deployment model internal to the company. There is considered multiple types of deployments and the type of deployment (architectural) is changed. One example would be an instance where after implementing the methods of FIG. 2E when there is a single deployment environment selected that cannot meet the needs of the client, and all additional amount of controls to de-rate the index value has been exhausted, then the deployment environment itself can be changed.

In accordance with this embodiment, in a Preparation Phase processing at step 200, FIG. 2F, the method identifies each alternative deployment model. For each alternative deployment model identified, at 205, the method establishes, the de-rating factor for one or a collection of each risk assessment meta data attribute element(s). Then, for each alternative deployment model, the method establishes a de-rating factor for development risk index (DRI).

Then, in an Operation Phase depicted in FIG. 2F, at 210, for the alternative control element, there is computed a new risk index (DRI) based on the established de-rating factor(s). This may include steps taken by the administrator (or equivalent software system) to select a weight of each risk assessment meta data attribute element; and re-compute the DRI according to:

Deployment Risk Index=sum over all elements' weight*value of risk assessment meta data attribute element Then, at 215, the processes include: determining whether the re-computed DRI is greater than the RTV, i.e., DRI>target RTV value. If it is determined that the DRI is less than the desired RTV value, then the process proceeds to step 240 where the method selects a deployment model based on thresholds with respect to the re-calculated deployment risk index, and deploys the workload to the selected deployment model. Otherwise, if it is determined that the re-calculated DRI is greater than the desired RTV value, then the process proceeds to 220 to determine whether there are any more alternative deployment models to recommend. Alternative deployment models to recommend may include, but are not limited to: an "intranet" deployment model (e.g., inside the company); an "isolated intranet" deployment model (e.g., private/isolated even inside company); a "single tenant" cloud deployment model (e.g., externally hosted, private cloud); a "multi-tenant" cloud deployment model (e.g., externally hosted, public cloud); an "isolated multi-tenant" cloud deployment model (e.g., externally hosted, hybrid cloud); a regulatory compliant deployment model (e.g., models with specific controls to individual regulatory rules), etc. If there are alternative deployment models to recommend, then the process proceeds to step 225 to select the additional alternative deployment model, establish the de-rating factor(s) and re-calculate the Deployment Risk Index and repeat the process steps 215-220 are repeated until the desired deployment index value is achieved.

Returning back to step 220 if it is determined that there are no more alternative deployment models to recommend, the process proceeds to 230, FIG. 2F where optionally, the client may be notified that "no deployment environment meets requirements".

The processes described herein of FIGS. 2E-2F may be iterative in the sense that one deployment host model may be selected, and if decided that the risk threshold cannot be met, implement the methods of FIG. 2E to add controls and de-rate the DRI value for that host environment. Then, if determined that the de-rated DRI Value does not meet the RTV needs, then perform the method of FIG. 2F to employ another deployment host environment, and if necessary, return to further implement the methods of FIG. 2E to add additional controls for de-rating the DRI value for the application running on the new deployment host environment.

Figure 3A:
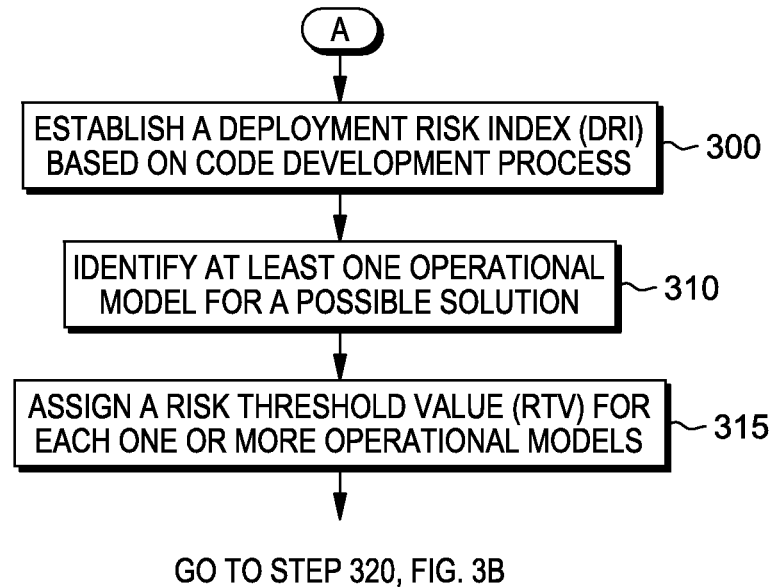
FIGS. 3A-3B show various embodiments of methods to identify application attributes and the associated operation attributes used to select an operations for supporting an operation in a selected hosting deployment environment.
Figure 3B:
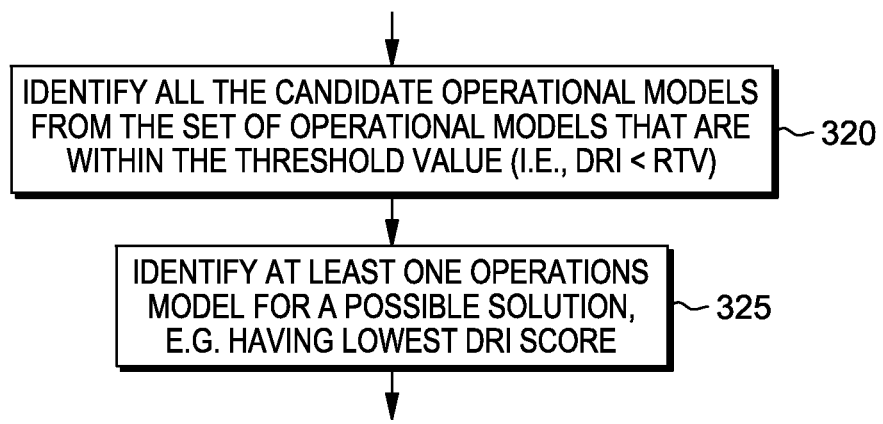

Details of the processing at the Operations Selection Engine 45 of FIG. 1B are now described with respect to FIGS. 3A-3B. In FIG. 3A, operations selection engine processing component 45 is implemented to select an operational model. In one embodiment, in a first Preparation Phase, an Administrator (or equivalent software system) collects operational Meta data attribute elements. Examples of operational Meta data include, but are not limited to: a Complexity of the application; a Level of custom code vs. out of the box functions; a Skill of the developer (e.g., high/low); a Number of interfaces/services; a specific data sensitivity; a Business criticality; and whether there is a governing Service Level Agreement (SLA).

Particularly, as shown at step 300, FIG. 3A, the Administrator (or equivalent software system) first establishes a deployment risk index (DRI) value as described herein based on the collected operational meta data attribute elements. For example, code that is old and bug-free having been deployed for years may only require operations model including a less-skilled staff, not working full time, vs. extremely brittle code that has not been in use very long which may require an operations model that would require a very skilled staff working full time. Then, at 310, the Administrator (or equivalent software system) identifies various operational models for a possible operations solution. Examples of operational models (OM) include but are not limited to: OM 1—Senior skilled support staff (certified), and 24×7 availability; OM 2—Junior skilled support staff and 8×5 availability. The Administrator (or equivalent software system) at 315 then identifies risk threshold values (RTV) for each operational model. This RTV assignment addresses operations such as a type of staff, e.g. skill levels of staff, and availability of staff, e.g., how long they work in a day, how long it takes to fix or troubleshoot a problem in the deployed infrastructure. For example, embedded code in software may be risky, however, the operations perspective will reinforce this risk by including more operation controls, for example, full support staff that are highly skilled. In one embodiment, an operations model may be decided upon with a separate RTV threshold assessed, i.e., an RTV different from the RTV assessed for the deployment model. The RTV assessments are encapsulated in criterion employed at 42 to select the Operations model as shown in FIG. 1B.

FIG. 3B depicts an Operation phase for selecting an Operations Model from the set of operations models based on a risk threshold. In this embodiment, given the Administrator (or equivalent software system) has identified various operations models for the possible solution and identified a risk threshold value (RTV) for each operations model, the Operations Selection Engine 45 may first, at 320, identify all the candidate deployment models from the set that are within the threshold value (i.e., DRI<RTV) and the operations engine (or an administrator) may select, at 325, the operations model from that candidate set. Then, Operations Selection Engine 35 recommends the operational model that reduces the overall risk. In one embodiment, Operations Selection Engine 35 may select the operations model with the least DRI score.

Figure 3C:
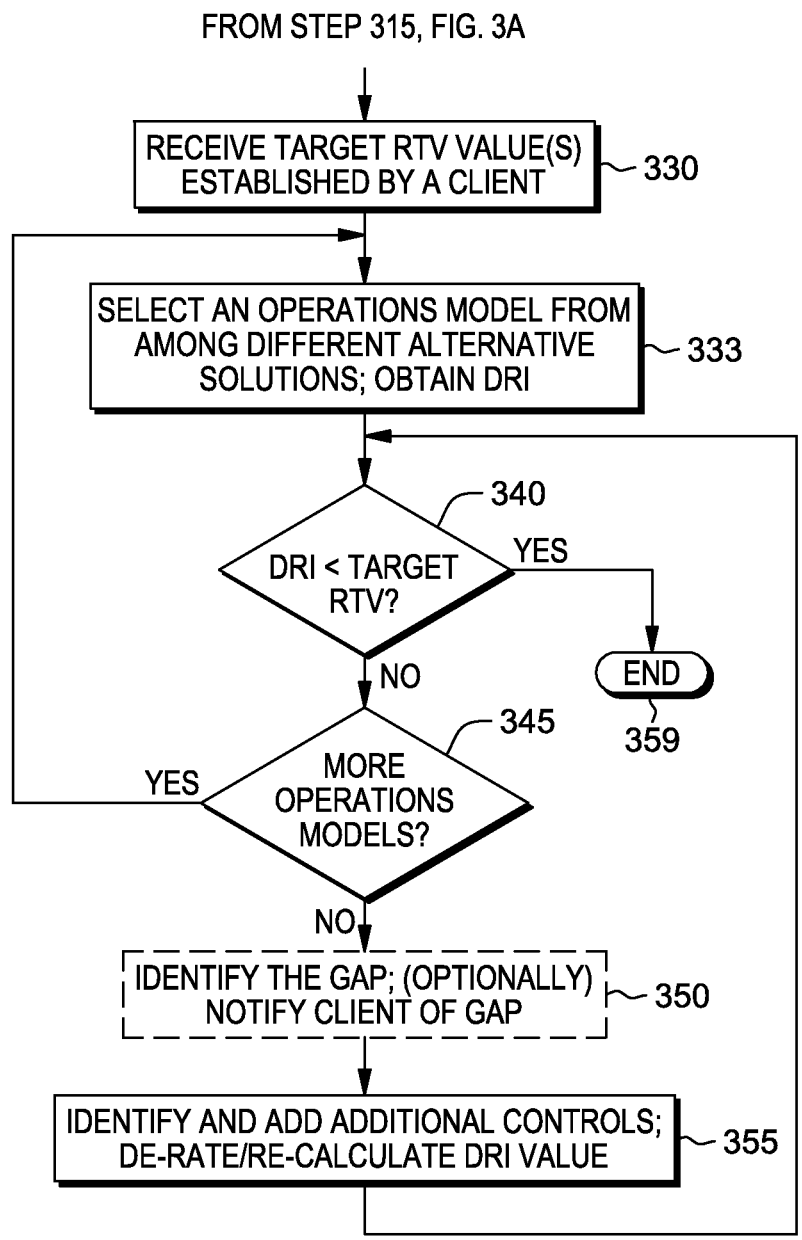
FIG. 3C depicts method steps performed by the Operations Selection Engine 45.

In an alternate embodiment to the method of FIG. 3B, the Operations Selection Engine 45 performs method steps as depicted in FIG. 3C, where in a Preparation Phase depicted at 330, the engine 35 receives from a client (another entity, not an administrator) or equivalent software system the client's established RTV thresholds.

Then, to achieve the specific target RTV set by the client, at 333, the Operations Selection Engine 45 selects operations components (a candidate operations model) from among different alternative solution models to achieve the specific threshold or target RTV. From the selected components of the operations model, a DRI is calculated. Then, the processing engine 45 employs methods including: at 340, determining whether the DRI is less than the RTV, i.e., DRI<RTV. If it is determined that the DRI is less than the RTV for the selected candidate operations model, then that operations model is used for the application and the process ends at 359. Otherwise, returning to 340, FIG. 3C, if the DRI value is greater than the target RTV, a determination is first made at 345 as to whether there is any more operations (models) to be selected. If there is more operations models to be selected, the process returns to step 333 so that a new operations model is selected and new DRI obtained for those selected components and the step 340 through 345 are repeated. However, if at 345 there is no more operations models left to select, then the process proceeds to step 350, where the Operations Selection Engine 45 identifies the gap between the DRI and RTV values, and optionally may notify the client about the presence of the gap. In a further embodiment, given the identified gap the Operations Selection Engine at 350, may look for and add additional controls to de-rate/re-calculate DRI value as was described in connection with FIG. 2E. If additional controls are added, the method will return to step 340 with the re-calculated DRI value and repeat steps for comparing that DRI value to the RTV value for that operations model.

It is understood that in connection with the processing described herein, if there are multiple operational models with DRI that are equivalent, other selection processes, such as cost, can be used to select the operational model. In addition, if there multiple operational models with DRI and costs that are not equivalent, the client can be given the opportunity to intentionally select an operational model with DRI>target RTV if the cost savings are significant.

In the following example scenarios, it is assumed there is a Developer (a code provider) role, an Administrator role, and an Operator role. Each of these entities can be software systems representing these roles.

A first Example 1 scenario is the selection of a Deployment Model from a given set of deployment models based on risk threshold. The steps include: The developer uses the development tool to document the meta-data. (For example, a degree of complexity of the code, skill level of the programmers, quality of code obtain/incorporated from $3^{rd}$ parties, development process followed); then, the Administrator selects a weight of each risk assessment meta data element; the Administrator further calculates the cumulative risk index: In this example scenario: the Deployment Risk Index (DRI)=sum over all elements' weight*value of risk assessment meta data element may arrive at an example value=8. The Administrator then identifies various deployment models (DM#) for the possible solution (e.g., DM#A, DM#B, DM#C, DM#D). The Administrator identified risk threshold values (RTV) for each deployment model (e.g., DM#A RTV=3, DM#B RTV=5. DM#C RTV=7, DM#D RTV=9). The Administrator then picks DM#D as the possible deployment model as (DRI<RTV). The Administrator then deploys the workload to DB#D.

A second Example 2 scenario is the selection of a Deployment Model and augmenting it to reduce the risk. The steps include: The developer uses the development tool to document the meta-data. For example: degree of complexity of the code, skill level of the programmers, quality of code obtain/incorporated from 3rd parties; Then, the Administrator selects weight of each risk assessment metadata element; Then the Administrator calculates the cumulative risk index: Deployment Risk Index (DRI)=sum over all elements' weight*value of risk assessment meta data element and may arrive at an example value=8. The Administrator identifies a deployment model for the possible solution (DM#A). The Administrator identified risk threshold values (RTV) for DM#A deployment model as 3. The Administrator wants to add additional controls to the deployment model to bring the DRI to 3 such that he can deploy the workload. The Administrator identifies few controls (c1: Install application firewall, c2: Install vulnerability detection tools, and c3: Employ data monitoring tools). Then the administrator identifies the risk de-rating for each added control (c1=2, c2=3, c3=1), and calculates the cumulative risk de-rating=6. Then the new DRI is calculated as original DRI-dr-rating value: the new DRI=8−6=2. Now DRI<RTI, so administrator can successfully deploy the workload to DM#A along with additional controls C1,C2 and C3.

In further embodiments, the system and methods may be extended to select deployment models that are targeted for "High Availability", "Performance" environments. The system and methods may be further extended to allow clients/customers/consumers to define the "weight" for each attribute. The system and methods may be extended to any other general service delivery type situations (e.g., identifying the right cloud deployment models, grid deployment models, etc.)

Thus, the present system and method considers the development environment, and bases any decision on data about the development environment to make a selection of hosting environment or operational attributes. The system and methods described determines and attaches metadata describing the development environment to an application, then uses that metadata to select a deployment model, and using that metadata to select an operational model. The method assigns a security risk score to a developed application which may be hosted in a virtual hosting environment or a physical hosting environment. The system and method considers security issues in its scoring and focuses on the security risk associated with an application that would be deployed. The method steps convey the application attributes, such as complexity, robustness, likelihood of operational issued, likelihood of compromise, etc. to the deployment and operating entities. That is, the system and method contain addresses the "deployment environment" an "operational environment" (e g, skill level of required support personal, type and degree of operational monitoring required.

The present system and method could be implemented in both an entity's traditional hosting environments as well as cloud environments. The systems and method may touch upon many aspects of application hosting and subsequent operations. For example, the system and methods may be employed in the context of a broad category of Software (including system software and systems management) including, but not limited to: software platform technologies (Including operating systems), e.g., including platform support for multitenancy; Software development life cycle, e.g., including requirements management; System Management, e.g., including application performance and availability management, and service-level- and process-driven management. The system and methods may be further employed in the context of a broad category of Business and Information Technology (IT) Services including, but not limited to: Information technology consulting services, e.g., including policy driven management; Managed services, e.g., including business process services, e.g., managed IT services; Service Management, e.g., including Service flows and choreography and service level management; Cloud Computing/Grid Computing, e.g., including cloud managed services, cloud services delivery; Optimization, e.g., including analytics or presentation means that enable new capabilities and IT optimization assets that can be used to streamline the development, production or delivery of IT services and solutions; and Systems Management Services, e.g., including system, application, resource management.

FIG. 4 illustrates one embodiment of an exemplary hardware configuration of a computing system 400 programmed to perform the method steps described herein with respect to FIGS. 2A-2F and 3A-3C. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of deploying a software application to a hosting environment comprising:

receiving, at a hosting provider, metadata attributes characterizing a constructing of the software application in a software application development environment, wherein the metadata attributes characterize a programmer's skill level, a size and complexity of a constructed software application code, an effectiveness of applied software application code testing, and a type of one or more tools or programs relating to the constructing or testing of the software application code;

assessing a risk value of deploying the software application based on the received metadata attributes;

selecting a deployment environment to run the software application from among one or more deployment environments based on the assessed risk value of deploying the software application;

deploying the software application to run at the selected deployment environment; and selecting an operations support model to support running the deployed software application when deployed to the selected deployment environment from among one or more operations support models based on the assessed risk value of deploying the software application and the selected deployment environment, wherein a processor performs one or more of the receiving, assessing, selecting, and deploying.

2. The method of claim 1, wherein assessing the risk value of deploying the software application comprises:

assigning a weight value of a risk assessment for one or more received metadata attributes characterizing the constructing of the software application; and calculating the risk value as a summation over all metadata attributes of the weight values of the risk assessment assigned for the one or more received metadata attributes.

3. The method of claim 2, further comprising:

applying, at the hosting provider, a criteria for associating a risk tolerance threshold value to each of the one or more deployment environments.

4. The method of claim 3, wherein selecting the deployment environment to run the software application from among the one or more deployment environments comprises:

comparing the calculated risk value against the associated risk tolerance threshold value of each of the one or more deployment environments; and selecting the deployment environment having the calculated risk value less than the associated risk tolerance threshold value.

5. The method of claim 4, further comprising:

determining the calculated risk value is not less than the associated risk tolerance threshold value of any of the one or more deployment environments; and in response, determining whether one or more control elements can be added to a deployment environment to reduce an assigned risk value of the deployment environment to below the associated risk tolerance threshold value, wherein the one or more control elements comprise one or more of: an application firewall, an increased CPU utilization, an increased memory, a data monitoring tool, a vulnerability detection tool, and an intrusion detection tool, and wherein each of the one or more control elements has an associated factor for reducing the assigned risk value of the deployment environment.

6. The method of claim 5, further comprising one of:
adding the one or more control elements to the selected deployment environment and deploying the software application to run at the selected deployment environment based on determining the assigned risk value of the deployment environment is reduced below the associated risk tolerance threshold value; or
selecting another deployment environment to run the software application from among the one or more deployment environments based on determining the assigned risk value of the deployment environment cannot be reduced below the associated risk tolerance threshold value.

7. A method of operating a software application in a hosting environment comprising:
receiving, at a hosting provider, metadata attributes characterizing a constructing of the software application in a software application development environment, wherein the metadata attributes characterize a programmer's skill level, an activity of one or more programmers or tools relating to the constructing of the software application, and a code type and complexity of the constructed software application;
receiving a type of deployment environment selected to run the software application;
deploying the software application to run at the selected type of deployment environment;
assigning a weight value of a risk assessment for one or more received metadata attributes characterizing operations supporting the deployed software application;
assessing a risk value of operating the software application based on the one or more received metadata attributes; and
selecting an operations support model to support running the deployed software application when deployed to the selected type of deployment environment from among one or more operations support models based on the assessed risk value of operating the software application and the selected type of deployment environment,
wherein a processor performs one or more of the receiving, deploying, assigning, assessing, and selecting.

8. The method of claim 7, further comprising:
applying a criteria for associating a risk tolerance threshold value to each of the one or more operations support models to support running the deployed software application when deployed to the selected type of deployment environment; and
selecting the operations support model to support running the deployed software application from among the one or more operations support models based on the assessed risk value of operating the software application, the applied criteria for associating the risk tolerance threshold value, and the selected type of deployment environment.

9. The method of claim 8, wherein selecting the operations support model to support running the deployed software application comprises:
calculating the risk value as a summation over all operations metadata attributes of the weight values of the risk assessment assigned for the one or more received metadata attributes;
comparing the calculated risk value against the associated risk tolerance threshold value of each of the one or more operations support models; and
selecting the operations support model having the calculated risk value less than the associated risk tolerance threshold value.

10. A system of deploying a software application to a hosting environment comprising:
a memory; and
a processor associated with the memory, the processor configured to:
receive metadata attributes characterizing a constructing of the software application in a software application development environment, wherein the metadata attributes characterize a programmer's skill level, a size and complexity of a constructed software application code, an effectiveness of applied software application code testing, and a type of one or more tools or programs relating to the constructing or testing of the software application code;
assess a risk value of deploying the software application based on the received metadata attributes;
select a deployment environment to run the software application from among one or more deployment environments based on the assessed risk value of deploying the software application;
deploy the software application to run at the selected deployment environment; and
select an operations support model to support running the deployed software application when deployed to the selected deployment environment from among one or more operations support models based on the assessed risk value of deploying the software application and the selected deployment environment.

11. The system of claim 10, wherein to assess the risk value of deploying the software application, the processor is further configured to:
assign a weight value of a risk assessment for one or more received metadata attributes characterizing the constructing of the software application; and
calculate the risk value as a summation over all metadata attributes of the weight values of the risk assessment assigned for the one or more received metadata attributes.

12. The system of claim 11, wherein the processor is further configured to:
apply a criteria for associating a risk tolerance threshold value to each of the one or more deployment environments.

13. The system of claim 12, wherein to select the deployment environment to run the software application from among the one or more deployment environments, the processor is further configured to:
compare the calculated risk value against the associated risk tolerance threshold value of each of the one or more deployment environments; and
select the deployment environment having the calculated risk value less than the associated risk tolerance threshold value.

14. The system of claim 13, wherein the processor is further configured to:
determine the calculated risk value is not less than the associated risk tolerance threshold value of any of the one or more deployment environments; and in response,
determine whether one or more control elements can be added to a deployment environment to reduce an assigned risk value of the deployment environment to below the associated risk tolerance threshold value, wherein the one or more control elements comprise one or more of: an application firewall, an increased CPU utilization, an increased memory, a data monitoring tool, a vulnerability detection tool, and an intrusion detection tool, and wherein each of the one or more control elements has an associated factor for reducing the assigned risk value of the deployment environment.

15. The system of claim 14, wherein the processor is further configured to:
add the one or more control elements to the selected deployment environment and deploy the software application to run at the selected deployment environment based on determining the assigned risk value of the deployment environment is reduced below the associated risk tolerance threshold value; or
select another deployment environment to run the software application from among the one or more deployment environments based on determining the assigned risk value of the deployment environment cannot be reduced below the associated risk tolerance threshold value.

16. A system of operating a software application in a hosting environment comprising:
a memory; and
a processor associated with the memory, the processor configured to:
receive metadata attributes characterizing a constructing of the software application in a software application development environment, wherein the metadata attributes characterize a programmer's skill level, an activity of one or more programmers or tools relating to the constructing of the software application, and a code type and complexity of the constructed software application;
receive a type of deployment environment selected to run the software application;
deploy the software application to run at the selected type of deployment environment;
assign a weight value of a risk assessment for one or more received metadata attributes characterizing operations supporting the deployed software application;
assess a risk value of operating the software application based on the one or more received metadata attributes; and
select an operations support model to support running the deployed software application when deployed to the selected type of deployment environment from among one or more operations support models based on the assessed risk value of operating the software application and the selected type of deployment environment.

17. The system of claim 16, wherein the processor is further configured to:
apply a criteria for associating a risk tolerance threshold value to each of the one or more operations support models to support running the deployed software application when deployed to the selected type of deployment environment; and
select the operations support model to support running the deployed software application from among the one or more operations support models based on the assessed risk value of operating the software application, the applied criteria for associating the risk tolerance threshold value, and the selected type of deployment environment.

18. The system of claim 17, wherein to select the operations support model to support running the deployed software application, the processor is further configured to:

calculate the risk value as a summation over all operations metadata attributes of the weight values of the risk assessment assigned for the one or more received metadata attributes;
compare the calculated risk value against the associated risk tolerance threshold value of each of the one or more operations support models; and
select the operations support model having the calculated risk value less than the associated risk tolerance threshold value.

19. A computer program product for deploying a software application to a hosting environment, the computer program product comprising a non-transitory computer readable storage medium, the non-transitory computer readable storage medium tangibly embodying a program of instructions executable by a computer to perform a method comprising:
receiving, at a hosting provider, metadata attributes characterizing a constructing of the software application in a software application development environment, wherein the metadata attributes characterize a programmer's skill level, a size and complexity of a constructed software application code, an effectiveness of applied software application code testing, and a type of one or more tools or programs relating to the constructing or testing of the software application code;
assessing a risk value of deploying the software application based on the received metadata attributes;
selecting a deployment environment to run the software application from among one or more deployment environments based on the assessed risk value of deploying the software application;
deploying the software application to run at the selected deployment environment; and
selecting an operations support model to support running the deployed software application when deployed to the selected deployment environment from among one or more operations support models based on the assessed risk value of deploying the software application and the selected deployment environment.

20. The computer program product of claim 19, wherein assessing the risk value of deploying the software application comprises:
assigning a weight value of a risk assessment for one or more received metadata attributes characterizing the constructing of the software application;
calculating the risk value as a summation over all metadata attributes of the weight values of the risk assessment assigned for the one or more received metadata attributes; and
applying, at the hosting provider, a criteria for associating a risk tolerance threshold value to each of the one or more deployment environments, wherein selecting the deployment environment to run the software application from among the one or more deployment environments comprises:
comparing the calculated risk value against the associated risk tolerance threshold value of each of the one or more deployment environments; and
selecting the deployment environment having the calculated risk value less than the associated risk tolerance threshold value.

* * * * *